(12) United States Patent
Wang et al.

(10) Patent No.: US 10,877,239 B2
(45) Date of Patent: Dec. 29, 2020

(54) OPTICAL ELEMENT STACK ASSEMBLIES

(71) Applicant: ams Sensors Singapore Pte. Ltd., Singapore (SG)

(72) Inventors: Ji Wang, Singapore (SG); Kam Wah Leong, Singapore (SG); Bojan Tesanovic, Steinhausen (CH); Qichuan Yu, Singapore (SG); Tobias Senn, Zurich (CH); Nicola Spring, Wangen (CH); Robert Lenart, Zurich (CH)

(73) Assignee: ams Sensors Singapore Pte. Ltd., Singapore (SG)

(*) Notice: Subject to any disclaimer, the term of this patent is extended or adjusted under 35 U.S.C. 154(b) by 125 days.

(21) Appl. No.: 15/775,232

(22) PCT Filed: Nov. 4, 2016

(86) PCT No.: PCT/SG2016/050545
§ 371 (c)(1),
(2) Date: May 10, 2018

(87) PCT Pub. No.: WO2017/082820
PCT Pub. Date: May 18, 2017

(65) Prior Publication Data
US 2018/0329175 A1    Nov. 15, 2018

Related U.S. Application Data

(60) Provisional application No. 62/254,287, filed on Nov. 12, 2015.

(51) Int. Cl.
*G02B 9/04* (2006.01)
*B29C 39/10* (2006.01)
(Continued)

(52) U.S. Cl.
CPC ............... *G02B 9/04* (2013.01); *B29C 39/10* (2013.01); *B29C 39/42* (2013.01); *B29D 11/00* (2013.01);
(Continued)

(58) Field of Classification Search
CPC . G02B 9/04; G02B 11/02; G02B 7/00; G02B 7/02; G02B 7/021; G02B 7/022;
(Continued)

(56) References Cited

U.S. PATENT DOCUMENTS 8,000,041 B1    8/2011  Lin et al.
8,520,137 B2 *  8/2013  Lee ................... G02B 13/0035
                                                      257/432
(Continued)

FOREIGN PATENT DOCUMENTS

| WO | 2011/055655 | 5/2011 |
| WO | 2013/026175 | 2/2013 |
| WO | 2015/126328 | 8/2015 |

OTHER PUBLICATIONS

ISA/AU, International Search Report for PCT/SG2016/050545 (dated Jan. 30, 2017).
(Continued)

*Primary Examiner* — Jie Lei
(74) *Attorney, Agent, or Firm* — Michael Best and Friedrich LLP

(57) ABSTRACT

Optical stack assemblies and fabrication techniques thereof. The optical stack assembly includes first and second sub-assemblies, each of which include a substrate and a sub-structure fixed to the respective substrate. Each sub-structures includes a respective first edge feature and a respective second edge feature that project away from the substrate of that sub-structure, each second edge feature being disposed laterally closer to an outer periphery of the respective (Continued)

sub-structure than the first edge feature of the same sub-structure. The first edge feature of the first sub-structure is in direct contact with the first edge feature of the second sub-structure, while the second edge feature of the first sub-structure and the second edge feature of the second sub-structure are attached to one another by adhesive. At least one of the first or second sub-structures includes an optical element on a same side of the sub-structure as the first and second edge features of that sub-structure. The optical element stack assembly further includes a spacer laterally surrounding, and moulded to, the first and second sub-assemblies.

10 Claims, 9 Drawing Sheets

(51) Int. Cl.
    *B29C 39/42*     (2006.01)
    *G02B 7/02*     (2006.01)
    *B29D 11/00*     (2006.01)
    *G02B 13/00*     (2006.01)
    *B29L 11/00*     (2006.01)

(52) U.S. Cl.
    CPC ........ *B29D 11/00307* (2013.01); *G02B 7/021* (2013.01); *G02B 13/0085* (2013.01); *B29D 11/00403* (2013.01); *B29K 2995/0031* (2013.01); *B29L 2011/00* (2013.01); *B29L 2011/0016* (2013.01)

(58) Field of Classification Search
    CPC ........................ G02B 27/00; G02B 27/0018; G02B 13/0085; B29C 39/10; B29C 39/42; B29D 11/00; B29D 11/00307; B29D 11/00403; B29K 2995/0031; B29L 2011/00; B29L 2011/0016

USPC ........ 359/717, 811, 455, 618–621, 665–667; 264/1.1, 1.32, 2.7

See application file for complete search history.

(56) References Cited

U.S. PATENT DOCUMENTS

| | | | |
|---|---|---|---|
| 8,587,882 B2 * | 11/2013 | Wippermann | G02B 7/028 |
| | | | 359/811 |
| 8,866,949 B2 | 10/2014 | Yano et al. | |
| 2009/0321861 A1 | 12/2009 | Oliver et al. | |
| 2010/0073534 A1 | 3/2010 | Yano et al. | |
| 2010/0208354 A1 | 8/2010 | Okazaki et al. | |
| 2013/0003184 A1 | 1/2013 | Duparre | |
| 2013/0019461 A1 | 1/2013 | Rudmann et al. | |
| 2013/0037054 A1 | 2/2013 | Saruya | |
| 2013/0048208 A1 | 2/2013 | Lin et al. | |
| 2013/0188267 A1 | 7/2013 | Oganesian | |
| 2013/0267273 A1 | 10/2013 | Rudmann et al. | |

OTHER PUBLICATIONS

European Patent Office Supplementary Search Report for Application No. 16864673.5 dated Jun. 6, 2019 (4 pages).
Intellectual Property Office of Taiwan Office Action for Application No. 105136785 dated Jan. 6, 2020 (10 pages including English translation).

* cited by examiner

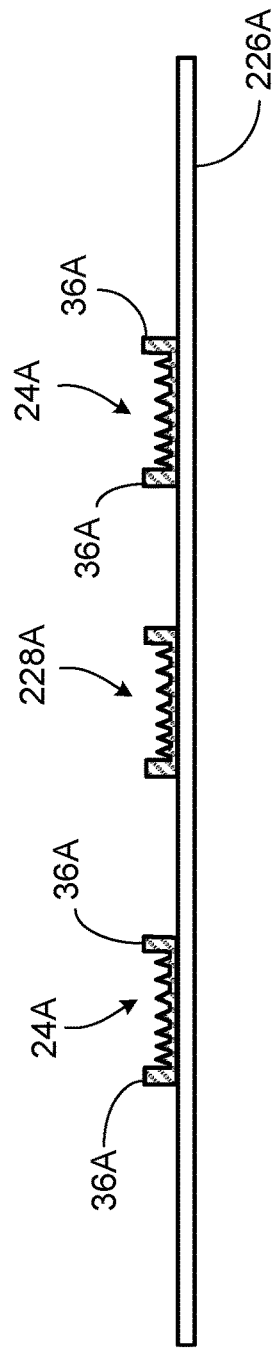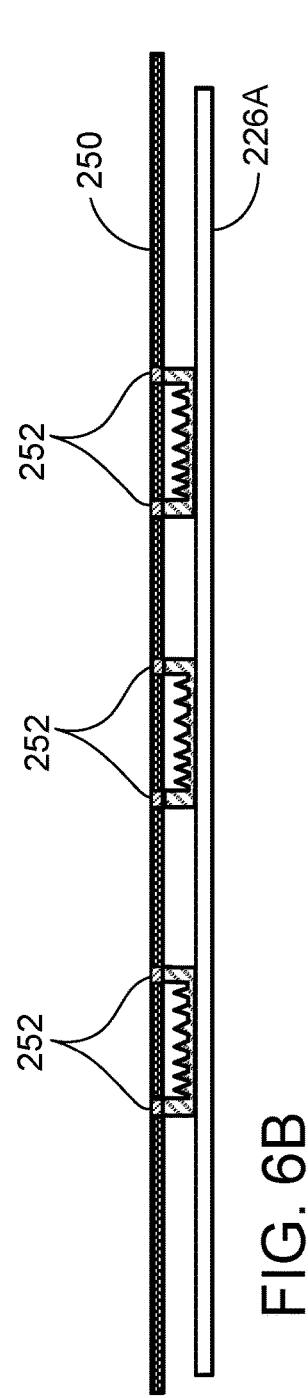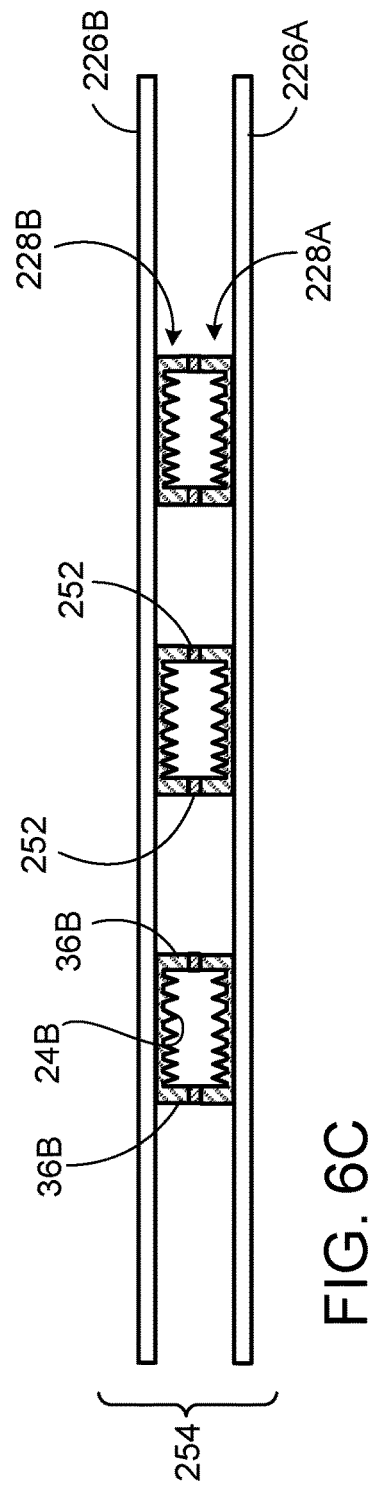

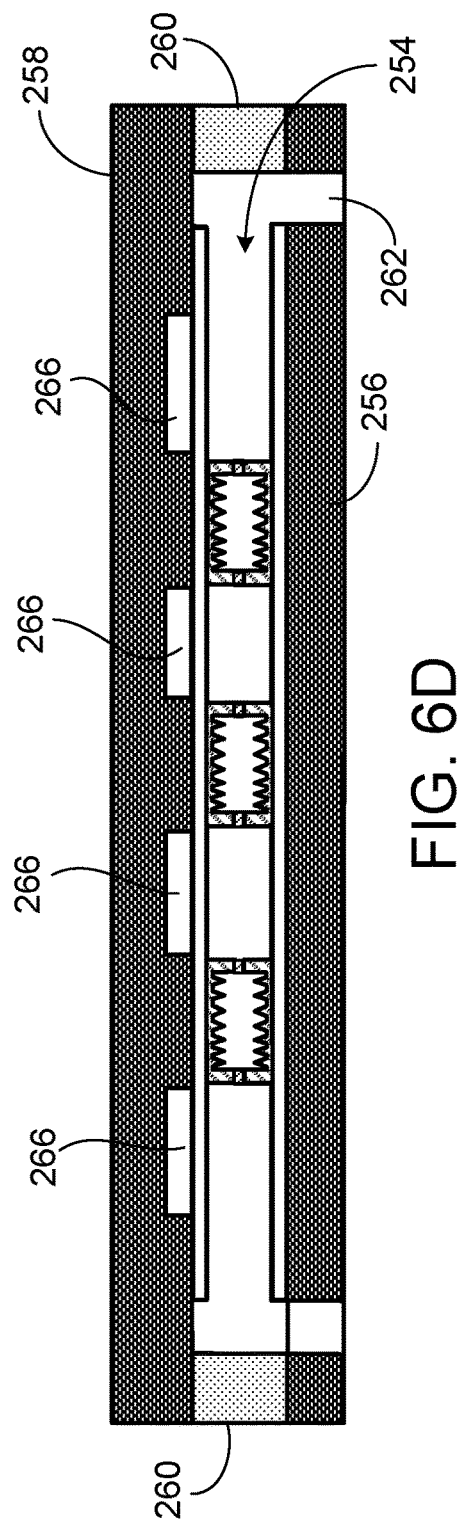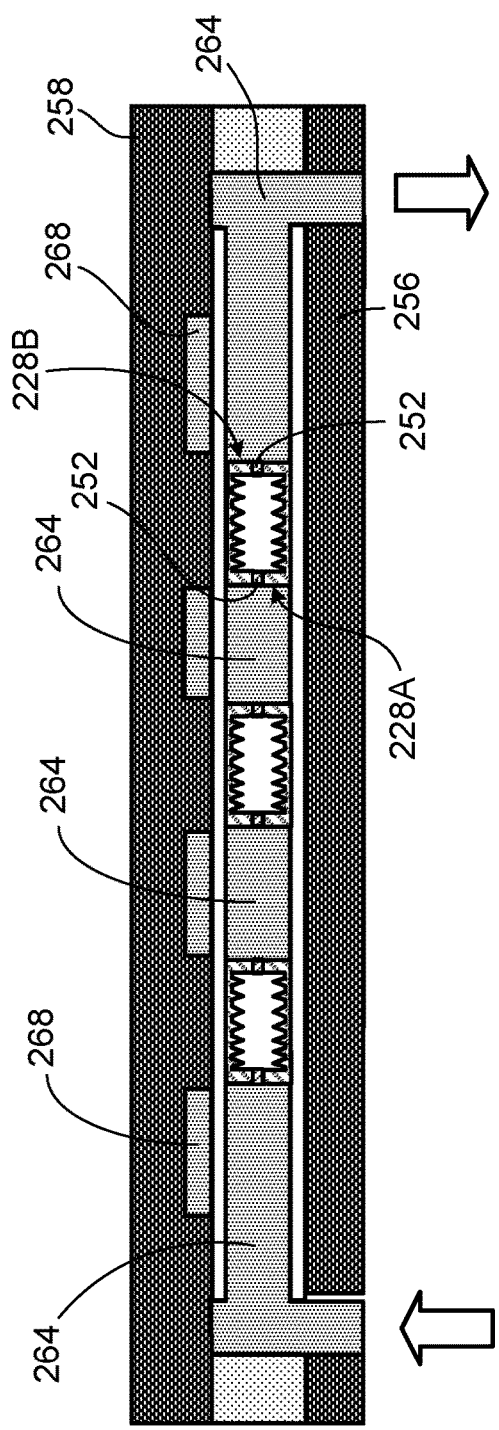

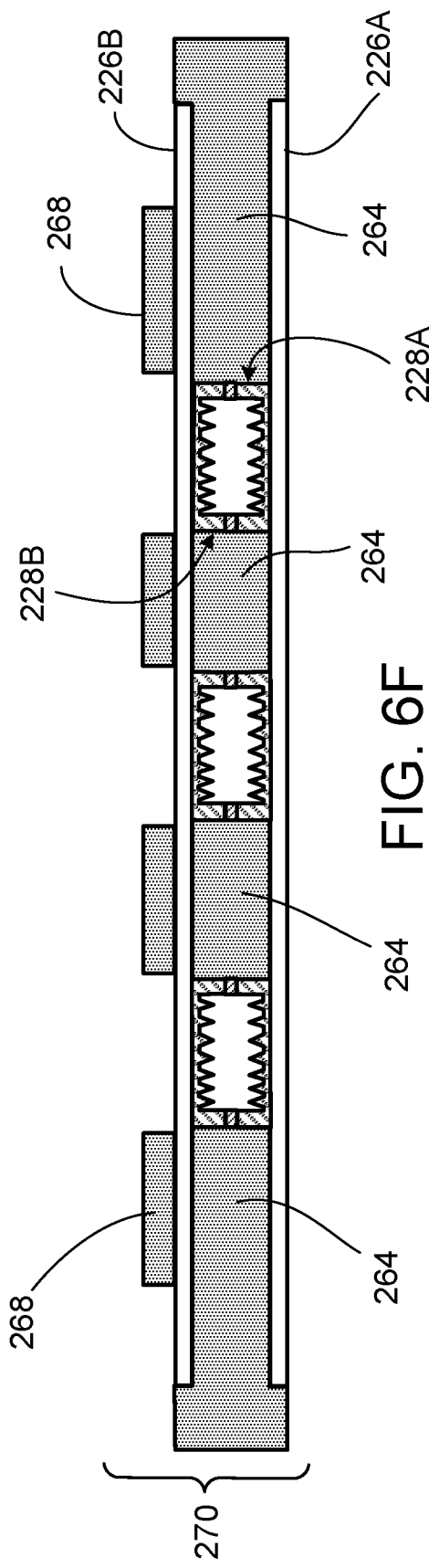
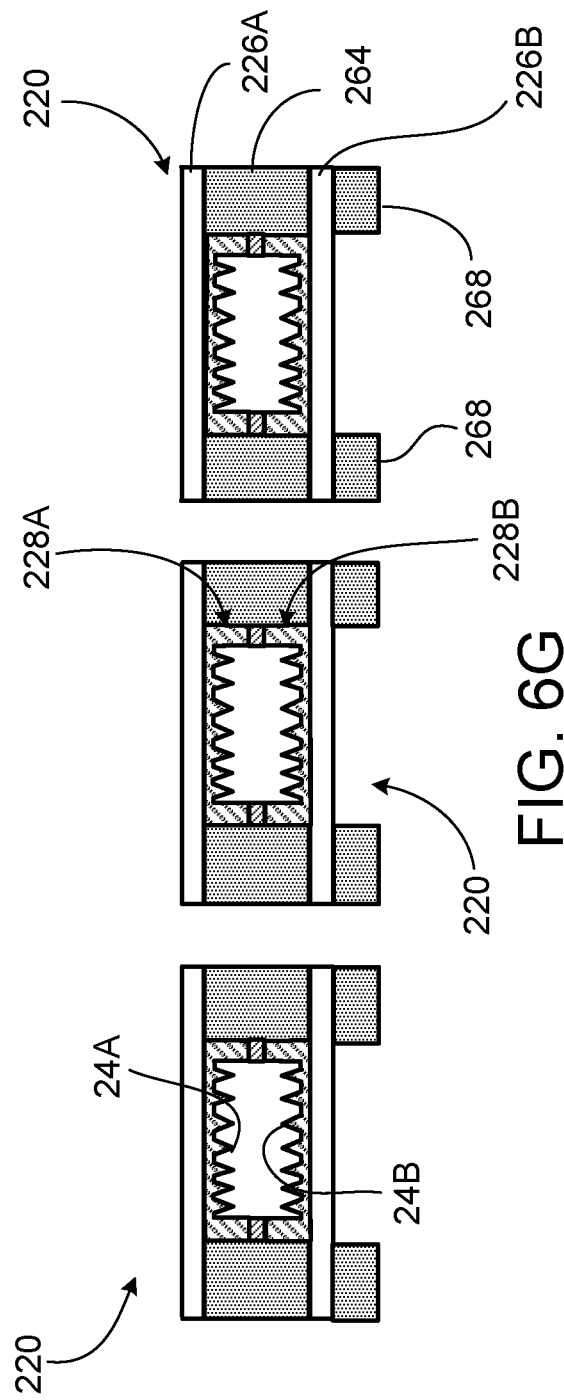
FIG. 6F
FIG. 6G

OPTICAL ELEMENT STACK ASSEMBLIES

FIELD OF THE DISCLOSURE

The present disclosure relates to optical element stack assemblies.

BACKGROUND

Various optoelectronics modules are used, for example, in imaging applications, such as three-dimensional (3D) imaging, or distance measurement applications, such as proximity sensing and time of flight (TOF) sensing. In some applications, an optical emitter assembly is operable to emit a structured optical pattern, which can be useful for imaging as well as distance sensing applications. The structured light can result in a pattern of discrete features (i.e., texture) being projected onto an object. Light reflected by the object can be directed back toward an image sensor, where it is sensed. The sensed signals can be used for distance calculations. In some cases, structured light provides additional texture for matching pixels in stereo imaging applications.

In some modules, an optical element, such as a diffractive optical element (DOE), is introduced into the path of light emitted by a light source such as a vertical cavity semiconductor emitting laser (VCSEL) or VCSEL array. The DOE can be useful in creating the structured light pattern. It also can facilitate multiplying a structured light pattern generated by the VCSEL or other light source.

Various methods can be used to fabricate optical element stack assemblies. In some cases, a stack of optical elements is formed. Various issues, however, can arise in some of some known fabrication techniques. For example, in many applications it is desirable to control the vertical (z-height) of the stack assembly. However, adhesive at the interface of the wafers used to form the stack assemblies can result in too much height variation from one assembly to another assembly. Further, in some cases, the adhesive may migrate onto adjacent surfaces (e.g., a surface of the optical element) and interfere with its optical characteristics. In addition, in some instances, surfaces of the optical element(s) may not be sealed entirely from the atmosphere. Indeed, to avoid migration of the adhesive onto the optical element surface, sometimes only a small amount of adhesive is provided at the interface between the wafers. The use of such small amounts of adhesive, however, can make it even more difficult to achieve an effective seal.

SUMMARY

The present disclosure describes optical stack assemblies and fabrication techniques that, in some implementations, can overcome or alleviate some or all of the foregoing issues.

In one aspect, an optical element stack assembly includes first and second sub-assemblies each of which includes a substrate and a sub-structure fixed to the respective substrate. At least one of the first or second sub-structures includes an optical element. The optical element stack assembly further includes a spacer laterally surrounding, and molded to, the first and second sub-assemblies.

Each of the sub-structures includes a respective first edge feature and a respective second edge feature that project away from the substrate of that sub-structure. Each second edge feature is disposed laterally closer to an outer periphery of the respective sub-structure than the first edge feature of the same sub-structure. The first edge feature of the first sub-structure is in direct contact with the first edge feature of the second sub-structure, whereas the second edge feature of the first sub-structure and the second edge feature of the second sub-structure are attached to one another by adhesive.

In some implementations, the first edge features, which are in direct contact with one another, can help establish the z-height of the assembly. The spacer laterally surrounding the sub-assemblies can help hold the sub-assemblies together and can help protect the optical elements, for example, from water, moisture and/or dust.

Some implementations include one or more of the following features. For example, the spacer can encapsulate peripheral side edges of the substrates and also may partially overlap upper and lower surfaces of the substrates.

In some instances, there is a space separating the first and second edge features of the first sub-structure from one another. In some cases, adhesive may be present in the space separating the first and second edge features of the first sub-structure.

In some implementations, the optical element is contiguous with the sub-structure of which it is a part. Further, in some instances, both sub-structures have an optical element. Thus, the first sub-structure can include an optical element on the same side as its first and second edge features; likewise, the second sub-structure can include an optical element on the same side as its first and second edge features. In some cases, the optical element of the first sub-structure is contiguous with the first and second edge features of the first sub-structure, and the optical element of the second sub-structure is contiguous with the first and second edge features of the second sub-structure.

In another aspect, the present disclosure describes a wafer-level method of fabricating optical element stack assemblies. The method includes providing a first wafer having multiple first sub-structures thereon, wherein each first sub-structure includes a respective optical element and a respective edge feature that projects away from the first wafer. The method further includes providing a second wafer having multiple second sub-structures thereon, wherein each second sub-structure includes a respective optical element and a respective edge feature that projects away from the second wafer. The edge features of the first sub-structures are attached, by adhesive, to the edge features of the second sub-structures to form a wafer stack. A vacuum injection molding technique is used to provide spacers that laterally surround the first and second sub-structures in the wafer stack. Subsequently, the wafer stack is separated into individual optical element stack assemblies.

In yet a further aspect, the present disclosure describes a method of fabricating a master mold. The method includes providing a wafer having an optical element structure thereon, and repeatedly performing the following so as to build up one or more edge features laterally surrounding the optical element structure: (a) applying a photoresist layer over a side of the wafer having the optical element structure thereon; and (b) selectively removing portions of the photoresist layer.

Other aspects, features and advantages will be readily apparent from the following detailed description, the accompanying drawings and the claims.

BRIEF DESCRIPTION OF THE DRAWINGS

FIGS. 6A-6G illustrate an example wafer-level method for manufacturing optical element stack assemblies.

DETAILED DESCRIPTION

Figure 1:
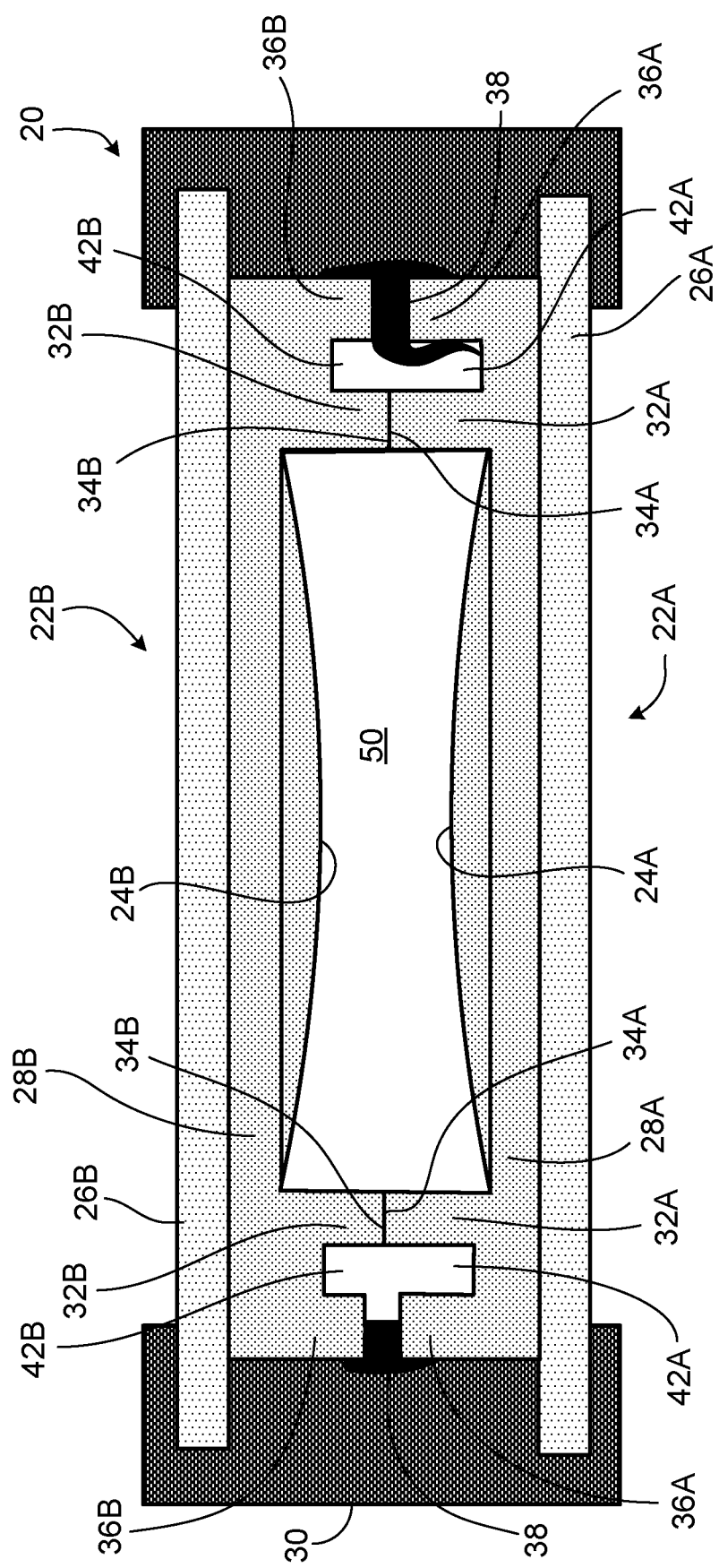
FIG. 1 illustrates an example of an optical element stack assembly.

FIG. 1 illustrates an example of an optical element stack assembly 20 that includes first and second sub-assemblies 22A, 22B held together so as to form a stack that includes one or more optical elements (e.g., refractive or diffractive optical elements) 24A, 24B. Each subassembly 22A, 22B includes a glass or other substrate 26A, 26B that is substantially transparent to radiation of a particular wavelength or range of wavelengths (e.g., in the visible, infra-red or near infra-red parts of spectrum). Each optical element 24A, 24B can be part of a respective sub-structure 28A, 28B that is fixed to a respective one of the substrates 26A, 26B.

Each optical element 24A, 24B can be formed, for example, as a contiguous piece with the respective sub-structure 28A, 28B. In some cases, each optical element 24A (or 24B) and the rest of the respective structure 28A (or 28B) form a unitary molded piece. The optical elements 24A, 24B and as well as other parts of the respective sub-structures 28A, 28B can be composed, for example, of an epoxy that is substantially transparent to the particular wavelength or range of wavelengths of interest.

In some instances, only one of the sub-assemblies 22A (or 22B) includes an optical element 24A (or 24B). In that case, the other sub-assembly would include the remainder of the structure 28A (or 28B), but without the optical element.

The two subassemblies 22A, 22B are held together by a molded spacer 30 that laterally surrounds the subassemblies. The spacer 30 also can encapsulate the peripheral side edges of the glass substrates 26A, 26B and partially overlap the upper and lower surfaces of the substrates, which can help hold the assembly together. To facilitate providing the foregoing features, the lateral dimensions of the sub-structures 28A, 28B can be made somewhat smaller than the lateral dimensions of the substrates 26A, 26B.

The spacer 30, which in some cases, may be composed of a polymer material that is substantially opaque to the particular wavelength or range of wavelengths of interest, can help protect the optical elements 24A, 24B from water, moisture and/or dust. The spacer 30 also helps hold together the first and second subassemblies 22A, 22B.

Each sub-structure 28A, 28B includes respective edge features that project away from the substrate 26A, 26B of the corresponding sub-assembly and are present on the same side of the sub-structure as the optical element 24A, 24B of the corresponding sub-assembly. In particular, the first sub-structure 28A includes a first edge feature 32A having a surface 34A that directly contacts an opposing surface 34B of a first edge feature 32B of the second sub-structure 28B so as to establish the z-height for the assembly 20. Each of the sub-structures 28A, 28B also includes a respective second edge feature 36A, 36B nearer its periphery than the corresponding first edge feature 32A, 32B. Adhesive 38 can be present between the opposing surfaces 44A, 44B of the second edge features 36A, 36B and helps hold the sub-assemblies together. In some cases, some of the adhesive 38 may be present in reservoir regions 42A, 42B that define a space between the first and second edge features (e.g., between edge features 32A, 36A of the first sub-structure 28A).

The edge features 32A, 36A laterally surround the optical element 24A. Likewise, the edge features 32B, 36B laterally surround the optical element 24B. In combination, the edge features 32A, 32B (or 36A, 36B) define an interior space 50 where the optical elements 24A, 24B are located.

Multiple assemblies 20 can be formed at the same time (i.e., in parallel) as part of a wafer-level process. Generally, a wafer refers to a substantially disk- or plate-like shaped item, its extension in one direction (z-direction or vertical direction) is small with respect to its extension in the other two directions (x- and y- or lateral directions). In some implementations, the diameter of the wafer is between 5 cm and 40 cm, and can be, for example, between 10 cm and 31 cm. The wafer may be cylindrical with a diameter, for example, of 2, 4, 6, 8, or 12 inches, one inch being about 2.54 cm. In some implementations of a wafer level process, there can be provisions for at least ten modules in each lateral direction, and in some cases at least thirty or even fifty or more modules in each lateral direction.

Figure 2:
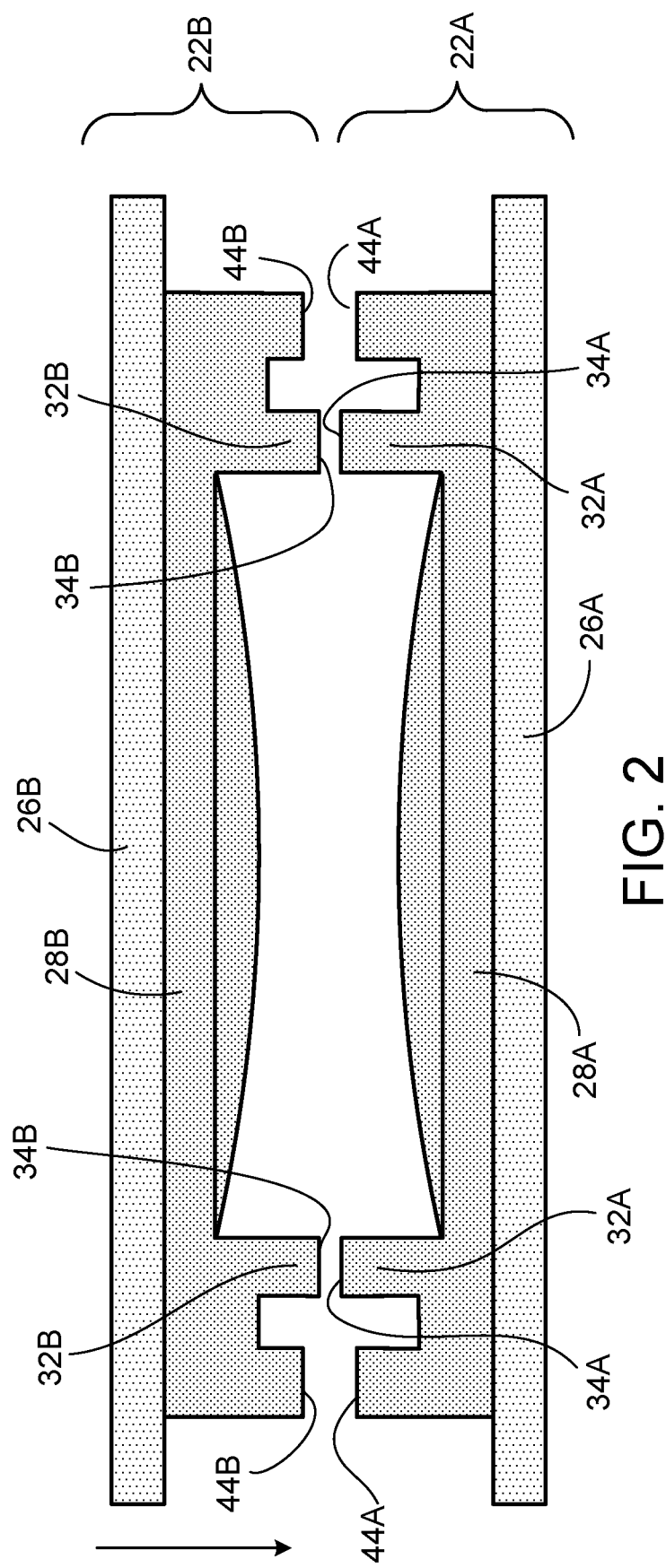
FIGS. 2 and 3 illustrate steps in forming the optical element stack assembly of FIG. 1.
Figure 3:
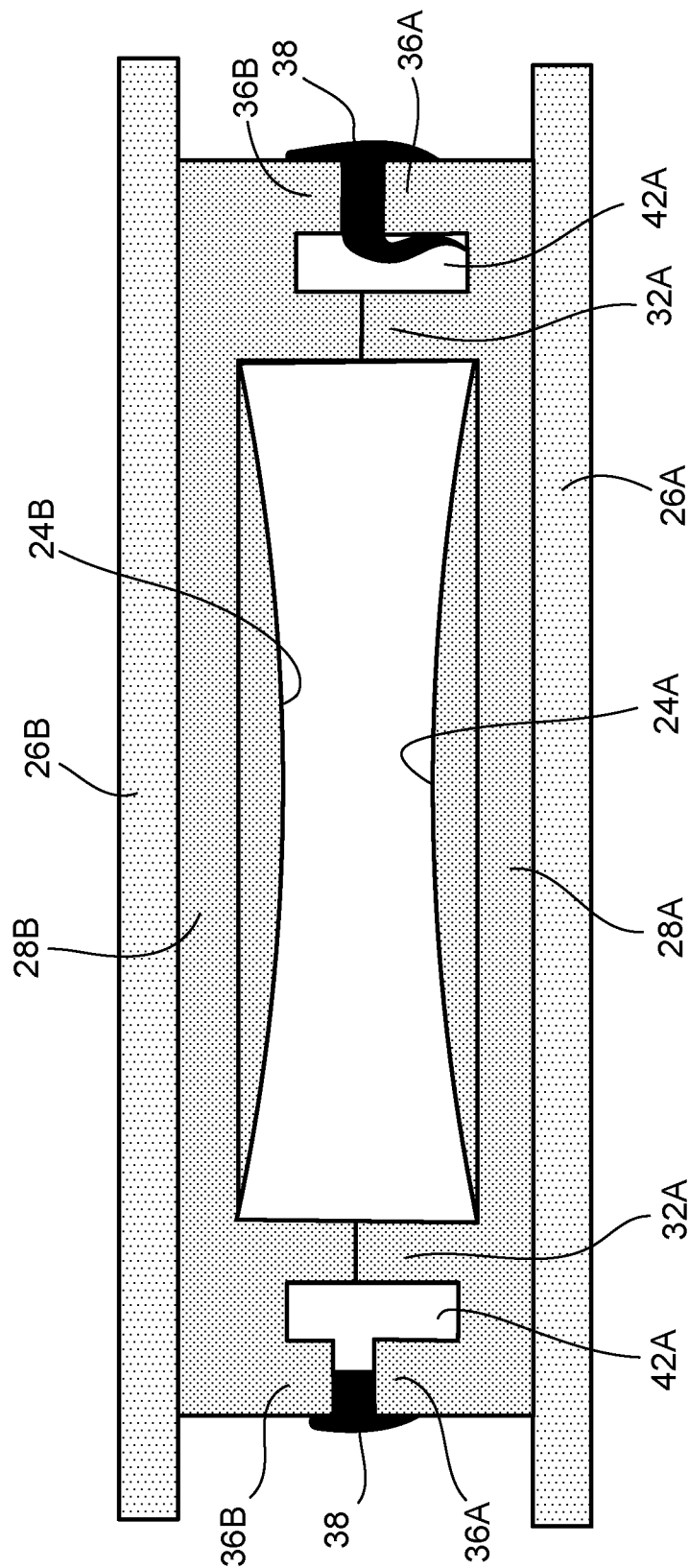

FIGS. 2 and 3 illustrate steps in a process for fixing together the first and second subassemblies 22A, 22B to form an optical element stack assembly 20. Although sub-assemblies are shown for fabricating a single assembly 20, the steps can be formed as part of a wafer-level process in which multiple assemblies are manufactured in parallel. First, the two subassemblies 22A, 22B are positioned one over the other and such that the edge feature surface 34A of the first sub-structure 28A is in contact with the edge feature surface 34B of the second sub-structure 28B.

Next, adhesive 38 is provided between the opposing surfaces 44A, 44B of the edge features 36A, 36B. The surfaces 44A, 44B are separated from one another by a small gap because the first edge features 32A, 32B extend further from their respective substrates 26A, 26B than do the second edge features 36A, 36B. The adhesive can be applied, for example, by screen printing (e.g., using high viscosity adhesive) or jetting the adhesive into the reservoir 42A (e.g., using low viscosity adhesive). The adhesive 38 helps hold the subassemblies 22A, 22B in place during subsequent processing steps. Some of the adhesive 38 also may adhere to the outer sides of the edge features 36A, 36B. Only a small amount of adhesive may be required to hold the subassemblies 22A, 22B together during subsequent processing (i.e., until the molded spacer 30 is formed). Further, the reservoir 42A in the space between the first and second edge features 32A, 36A can accommodate overflow of the adhesive 38 (if any), thereby preventing excess adhesive from flowing onto the optical elements 24A, 24B. In some cases, instead of depositing the adhesive 38 directly onto the opposing edge feature surfaces 44A, 44B, the adhesive can be deposited within the reservoir 42A such that some of it subsequently flows onto the surfaces 44A, 44B.

Next, the spacer 30 (see FIG. 1) can be formed, for example, by a vacuum injection molding technique. Further details of a suitable process are described below.

Figure 4A:
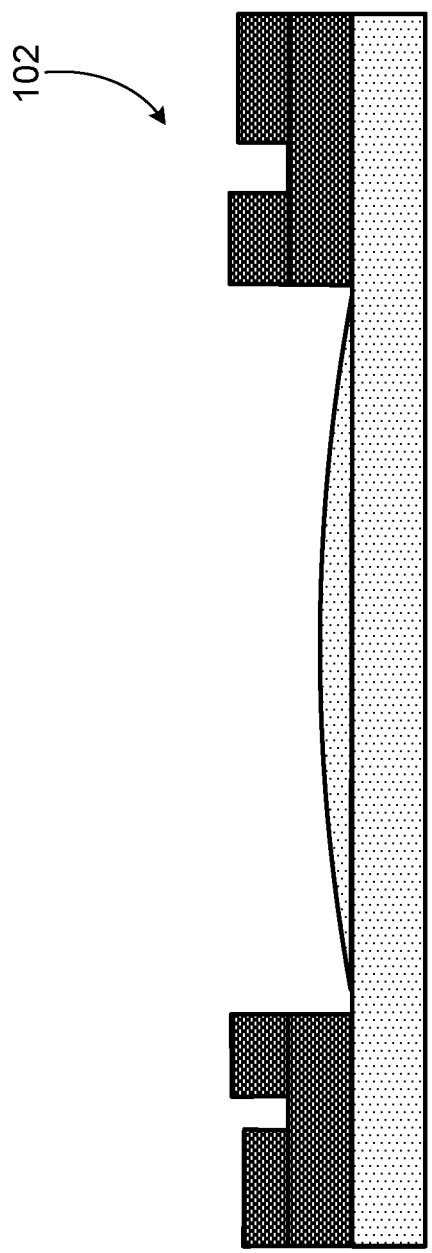
FIG. 4A illustrates an example of a master mold.
Figure 4B:
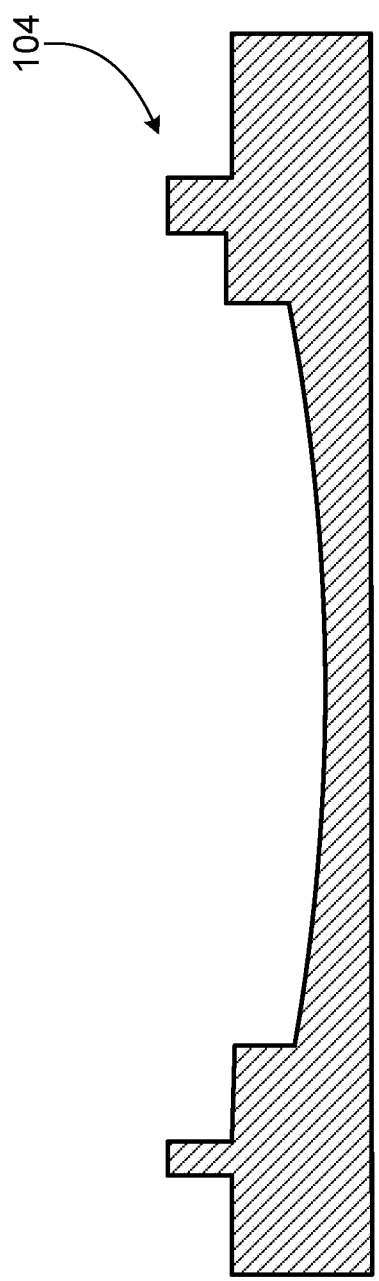
FIG. 4B illustrates an example of tool for making sub-structures for the sub-assemblies.

The sub-structures 28A, 28B for the subassemblies 22A, 22B can be formed, for example, using a poly(dimethylsiloxane) ("PDMS") tool, which can be made from a master mold. An example of the (positive) master mold 102 is illustrated in FIG. 4A, and an example of the (negative) PDMS tool 104 is illustrated in FIG. 4B. The PDMS tool 104 can be used, for example, in a wafer-level replication process to form the sub-structures 28A, 28B. In such a replication process, the PDMS tool is pressed, for example, into an epoxy material on a glass substrate so as to form the optical elements (e.g., 24A). The edge features (e.g., 32A and 36A) are simultaneously formed in the overflow portion of the epoxy material.

The dimensions of the edge features may vary depending on the application. However, in some instances, the height of each first edge feature 32A, 32B is about twice the height of each second edge feature 36A, 36B. For example, in some cases, each first edge feature 32A, 32B has a height of about 34 µm, whereas each second edge feature 36A, 36B has a height of about 17 µm, where the heights indicate how far the edge features project beyond the respective reservoir region 42A (or 42B). The reservoir regions 42A, 42B can have a relatively narrow width (e.g., on the order of about 15 µm).

Figure 5A:
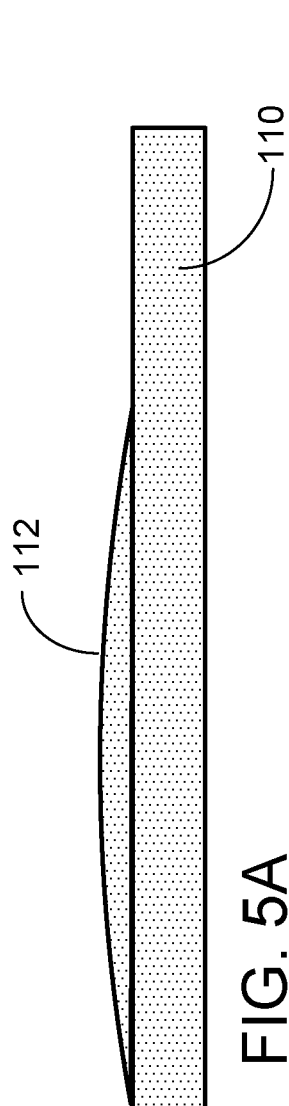
FIGS. 5A-5E illustrate an example of how to make a master mold.
Figure 5B:
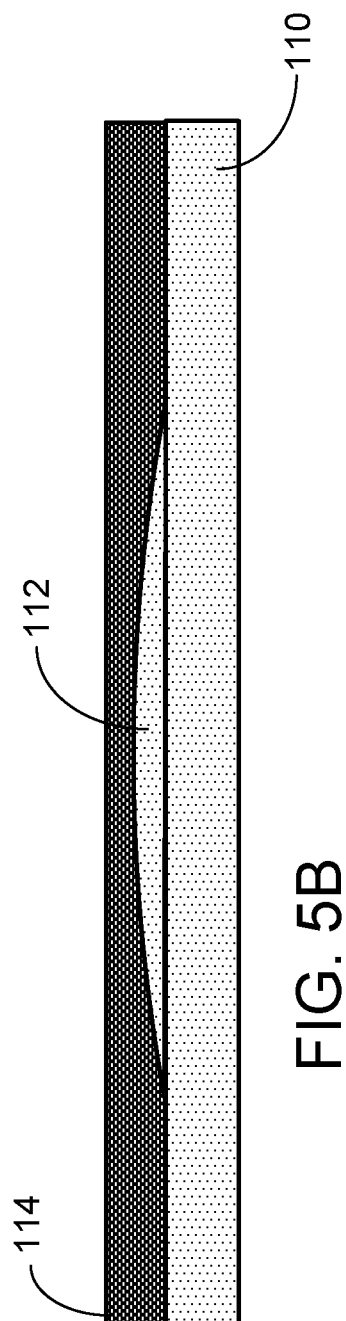
Figure 5C:
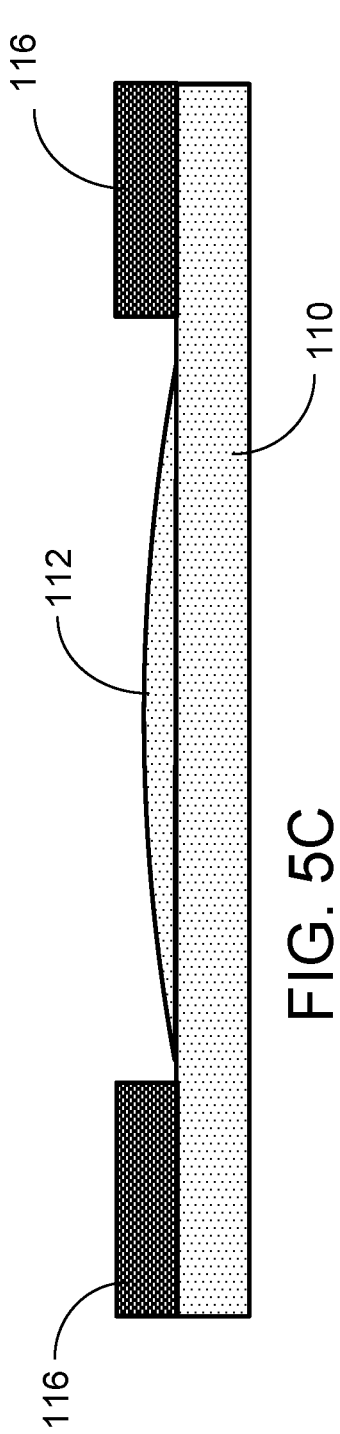
Figure 5D:
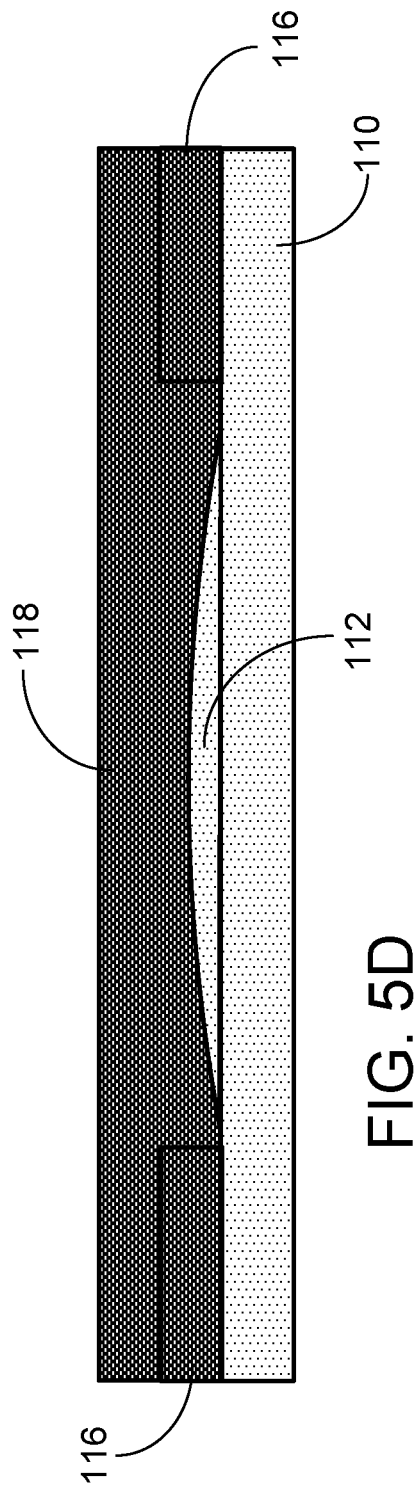
Figure 5E:
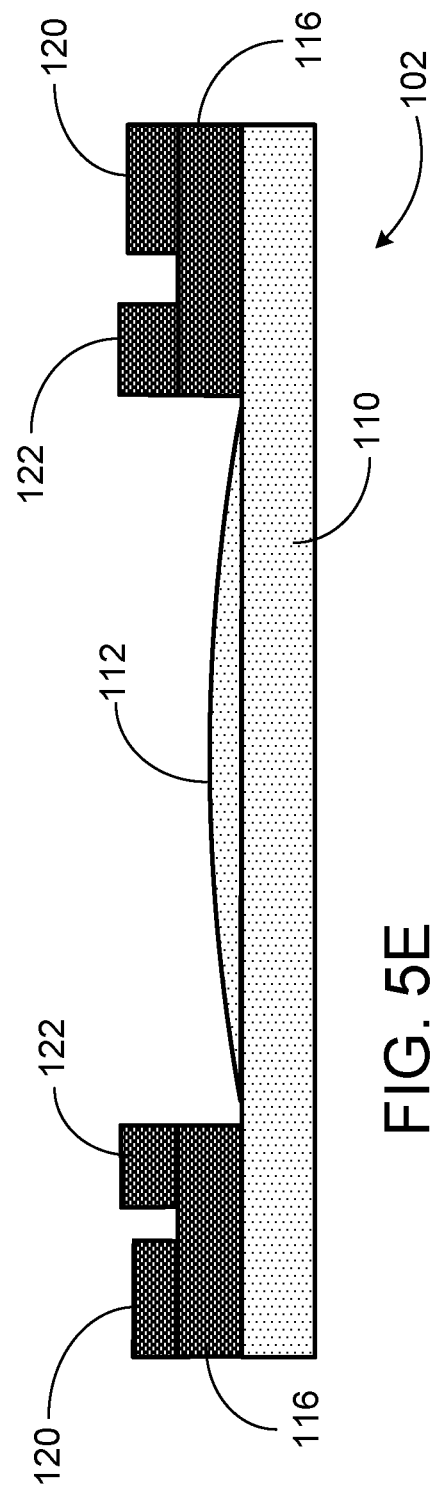

FIGS. 5A-5E illustrate an example of how the (positive) master mold 102 of FIG. 4A can be made. As indicated by FIG. 5A, the master mold can be made by providing, for example, a glass wafer 110 that has a structure 112 corresponding to form of the optical element (e.g., a lens). The structure 112 can be formed, for example, by laser writing or laser engraving the glass wafer 110. Next, as indicated by FIG. 5B, a layer of photoresist (e.g., dry resist) 114 is applied over the side of the wafer 110 that has the structure 112 for the optical element. The photoresist 114 then is cured, patterned by standard photolithographic techniques, and selectively removed (e.g., by etching) to build up edge features 116 (see FIG. 5C). Another layer of photoresist 118 is applied over the wafer 110 (FIG. 5D). The photoresist 118 can be cured, patterned by photolithography, and partially removed to continue building up the edge features 120, 122 (FIG. 5E). In some implementations, each photoresist layer 114, 118 has a thickness on the order of about 50 µm. The foregoing steps can be repeated, as needed, to build up the edge features.

As mentioned above, multiple stack assemblies 20 can be formed at the same time as part of a wafer-level process. FIGS. 6A-6G illustrate steps in an example of a wafer-level process for making optical element stack assemblies. In the illustrated example of FIGS. 6A-6G, the sub-structures 228A, 28B include edge features 36A, 36B, but do not include edge features 32A, 32B of the FIG. 1 implementation. Thus, in the illustrated example, the sub-structures 228A, 228B also do not include the reservoir regions 42A, 42B of the FIG. 1 implementation. Nevertheless, the same overall process described in connection with FIGS. 6A-6G can be used for sub-structures that include both first and second edge features 32A and 36A (or 32B and 36B), as well as a reservoir 42A (or 42B) as in the FIG. 1 implementation.

As shown in FIG. 6A, a first glass wafer 226A is provided and has multiple sub-structures 228A formed on one of its surfaces. The glass wafer 226A may be referred to as a first optical element wafer. Each sub-structure includes an optical element 24A replicated in epoxy material, whose overflow portion serves as an edge feature 36A to facilitate stacking. As illustrated in FIG. 6B, adhesive (e.g., bonding glue) 252 is applied to the upper surface of each edge feature 36A, for example, by screen printing using a pattern stencil 250. After removing the stencil 250, a second optical element wafer that includes multiple sub-structures 228B on the surface of a glass wafer 226B is stacked over the first optical element wafer (see FIG. 6C). Each sub-structure 228B includes an optical element 24B replicated in epoxy material, whose overflow portion serves as an edge feature 36B to facilitate stacking. The first and second optical element wafers are aligned such that their respective edge features 36A, 36B are attached to one another by the adhesive 252, thus forming a stack 254.

Next, as shown in FIG. 6D, the wafer stack 254 is placed on a substantially flat support 256, and a vacuum injection tool 258 is moved into contact over the stack. The vacuum injection tool 258 is separated from the support 256 by a seal plate 260. A vacuum pump can be provided near the exit port 262 to facilitate flow of vacuum injected polymer material 264 such that it laterally surrounds the stacked sub-structures 228A, 228B (FIG. 6E). In the illustrated example, the vacuum injection tool 258 also include spaces 266 (FIG. 6D) for formation of spacers 268 composed of the vacuum injected polymer material (FIG. 6E). The spacers 268 can facilitate mounting the resulting stack assemblies, for example, on a printed circuit board. The vacuum injected polymer material then can be cured (e.g., by UV and/or thermal curing). The resulting wafer stack, including the cured vacuum injected polymer material, is demolded and removed from the vacuum injection tools 256, 258, as shown in FIG. 6F. The resulting wafer stack 270 then is separated (e.g., by dicing) to form multiple stack assemblies 220 (FIG. 6G), each of which includes one or more optical elements (e.g., lenses; DOEs).

As mentioned above, the same overall process described in connection with FIGS. 6A-6G can be used for sub-structures that include both first and second edge features 32A and 36A (or 32B and 36B), as well as a reservoir 42A (or 42B) as in the FIG. 1 implementation. Thus, in some cases, the wafer-level process includes processing as described above in connection with FIGS. 2 and 3.

Various modifications can be made to the foregoing stack assemblies and to the methods of manufacture. Features from different implementations described in detail above can be combined in some cases. Accordingly, other implementations are within the scope of the claims.

What is claimed is:

1. An optical element stack assembly comprising:
    first and second sub-assemblies each of which includes a substrate and a sub-structure fixed to the respective substrate,
    wherein each of the sub-structures includes a respective first edge feature and a respective second edge feature that project away from the substrate of that sub-structure,
    wherein each said first edge feature of a said sub-structure projects further away from the substrate of that sub-structure than the second edge feature of that sub-structure,
    wherein each second edge feature being disposed laterally closer to an outer periphery of the respective sub-structure than the first edge feature of the same sub-structure,
    wherein the first edge feature of the first sub-structure is in direct contact with the first edge feature of the second sub-structure,
    wherein the second edge feature of the first sub-structure and the second edge feature of the second sub-structure are attached to one another by adhesive, and
    wherein at least one of the first or second sub-structures includes an optical element on a same side of the sub-structure as the first and second edge features of that sub-structure,
    the optical element stack assembly further comprising a spacer laterally surrounding, and molded to, the first and second sub-assemblies, wherein the spacer is in direct contact with the second edge feature of the first sub-structure and the second edge feature of the second sub-structure.

2. The optical element stack assembly of claim 1 wherein largest lateral dimensions of the substructures are smaller than corresponding lateral dimensions of the substrates.

3. The optical element stack assembly of claim 1 wherein the spacer encapsulates peripheral side edges of the substrates.

4. The optical element stack assembly of claim 3 wherein the spacer partially overlaps upper and lower surfaces of the substrates.

5. The optical element stack assembly of claim 1 having a space separating the first and second edge features of the first sub-structure from one another.

6. The optical element stack assembly of claim 5 wherein there is adhesive present in the space separating the first and second edge features of the first sub-structure.

7. The optical element stack assembly of claim 1 wherein the optical element is contiguous with the sub-structure of which it is a part.

8. The optical element stack assembly of claim 1 wherein the first sub-structure includes an optical element on the same side as its first and second edge features, and wherein the second sub-structure includes an optical element on the same side as its first and second edge features.

9. The optical element stack assembly of claim 8 wherein the optical element of the first sub-structure is contiguous with the first and second edge features of the first sub-structure, and wherein the optical element of the second sub-structure is contiguous with the first and second edge features of the second sub-structure.

10. The optical element stack assembly of claim 1 wherein the substrates are composed of glass, the first and second sub-structures are composed of an epoxy material that is substantially transparent to a particular wavelength, and the spacer is composed of a polymer material that is substantially opaque to the particular wavelength.

* * * * *